Dec. 16, 1958     G. B. LINDERMAN     2,864,996
DETECTING APPARATUS
Filed April 15, 1955
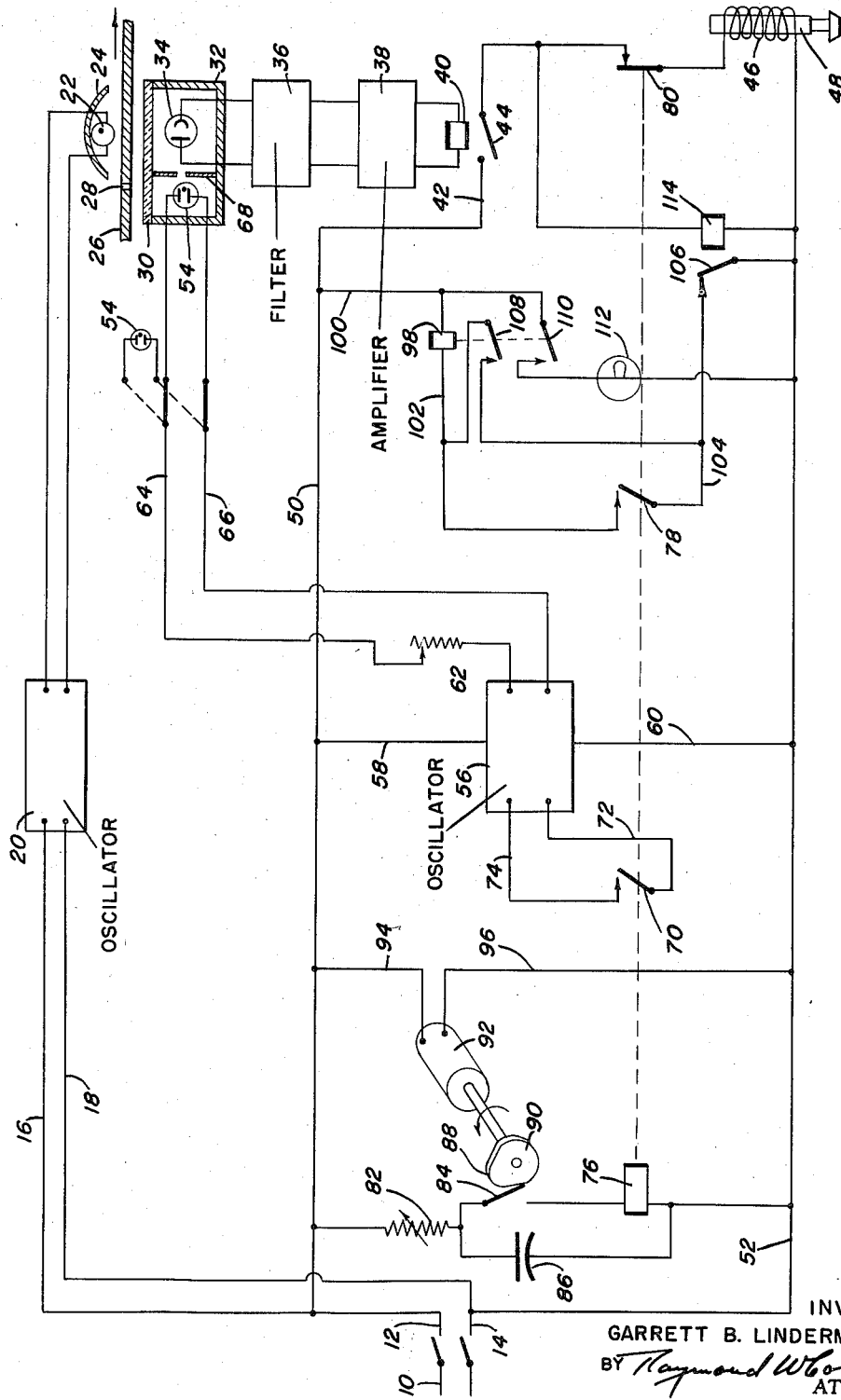
INVENTOR
GARRETT B. LINDERMAN
BY Raymond W Coolter
ATTORNEY

United States Patent Office 2,864,996
Patented Dec. 16, 1958

2,864,996

DETECTING APPARATUS

Garrett B. Linderman, Washington, D. C., assignor to Linderman Engineering Company, Inc., a corporation of Maryland Application April 15, 1955, Serial No. 501,671

12 Claims. (Cl. 324—20)

This invention relates to pin hole detectors and particularly to the types of pin hole detectors used in conjunction with tin plate.

Inasmuch as pin hole detectors used for tin plate operations must ordinarily respond at maximum sensitivity in order to sense very small openings, the factors contributing to the loss of such sensitivity must be checked from time to time to assure proper operation of the equipment. The accumulation of dust on the window protecting the light sensitive cells is often sufficient to cause trouble. The photosensitive elements may suffer such reduction of their sensitivity due to aging or other reasons to an extent that would also introduce difficulties.

In the past, in order to ascertain the condition of pinhole detectors, it has been necessary to interrupt the entire line, remove the tin plate from the detector and introduce in its place a test sheet containing a pin hole of predetermined size in order to test the response of the apparatus. Such procedures have been very costly since the production of tin plate is a continuous operation involving a large quantity of relatively expensive machinery. To shut down a line of this type for the time necessary to conduct a test is thus expensive and undesirable.

It is an object of the present invention to solve the problems involved by providing in combination with a pin hole detector having a work path, a light source and a shielded photosensitive device disposed on opposite sides of the work path and an output circuit energized by the photosensitive device and containing a signal responsive device, testing apparatus comprising an indicator circuit containing an indicator and a switch therefor for energization by the photosensitive device, a test circuit including a current source, a switch, and a test lamp positioned to direct light upon the photosensitive device, and actuating means for operating the switches whereby the indicator will signify the condition of the photosensitive device.

The output circuit of the pin hole detector energized by the photosensitive device may contain a normally closed switch to be opened by the actuating means before closure of the test circuit switch. The invention also contemplates periodic actuation of the actuating means and separate excitation of the light source and test lamp by sources of similar frequency. It is also proposed that the test lamp be provided with control means for directing a predetermined quantity of light towards the photosensitive device.

The operation of the switches by the actuating means may be momentary and the actuating means may include a relay for operating the indicator switch, the relay remaining energized so long as the photosensitive device fails to respond to light from the test lamp. The photosensitive device and test lamp may be disposed in a common housing or alternatively, under special conditions, the test lamp may be located externally of the housing for the photosensitive device. The indicator switch and test circuit switch are normally open in accordance with a preferred form of the invention.

The test lamp and principal light source preferably produce light of the same quality. The test lamp can be energized at predetermined intervals, spaced in accordance with the requirements of a particular installation. The indicator or alarm means may produce signals which are optical, audible or both, and during a testing operation, any instrumentalities ordinarily actuated by the pin hole detector, such as diverting gates, markers, or the like, can be inactivated.

A more complete understanding of the invention will follow from a description of the accompanying drawing.

The pin hole detector depicted in the drawing is the type employing ultraviolet light, it being understood however, that the invention is applicable to those types of apparatus using other forms of light sources.

An alternating current source 10 supplies switch terminals 12 and 14 to which are connected respectively, the conductors 16 and 18 supplying an oscillator 20 which produces an elevated frequency to supply the ultraviolet lamp 22 whose reflector 24 concentrates light on the upper surface of a sheet of tin plate 26 traversing a work path from left to right as viewed in the drawing. When a pin hole 28 arrives in the path of light emanating from the source 22, such light will penetrate a filter or other light transmitting plate 30 of the housing 32 containing a suitable number of photosensitive devices 34 which will respond to light directed from the source 22. Where a plurality of light sensitive devices 34 are employed, as will usually be the case, they may be connected in parallel to a filter 36 tuned to pass frequencies in the range of those of the oscillator 20 to supply an amplifier 38 for energizing a signal responsive device shown as a relay having a winding 40. Under ordinary conditions, when the relay 40 is energized, its contacts 42 and 44 will be closed to energize the winding 46 of a signal responsive device 48 from the source 10 by way of conductors 50 and 52. The signal responsive device 48 is shown diagrammatically as a marking device, but it will be understood among those skilled in the art that such a device may be replaced by or operated in conjunction with a diverting gate or other instrumentality whose operation may be desired in response to the occurrence of a pin hole.

The apparatus thus far described is typical of equipment already in use. Were it necessary or desirable to test the operation of this apparatus, the sheet 26 would be removed from its path between the light source 22 and the photosensitive device 34 and a test sheet containing a pin hole of known location and dimensions would be substituted to determine whether or not the apparatus operated satisfactorily. Improper operation could be caused by a faulty light source, interference with the optical path resulting from dust on the surface of the plate 30, or difficulty in the photosensitive device or devices or portions of the output circuit containing the filter 36, amplifier 38, relay winding 40, or the signal responsive device 48.

In order to provide means for testing the apparatus without requiring a shut-down of the line, one or more test lamps 54 are provided, shown as ultraviolet light sources, one within the housing 32 occupied by the photosensitive device 34 and one externally disposed. The test lamp or lamps will be supplied from an oscillator 56 connected to the source of supply 10 through leads 58 and 60 and tuned to a frequency corresponding with that of the oscillator 20 supplying the main light source 22. The output of the light source 54 can be controlled by adjustment of a variable resistance 62 connected in series with its supply leads 64 and 66, or by proper selection of or adjustment of an aperture containing wall 68 interposed between the test lamp 54 and the light sensitive device 34.

Under ordinary operating conditions of the pin hole detector, the oscillator 56 will remain in stand-by condition so that when a test operation is desired it will be necessary only to trigger the oscillator 56 by closure of a switch 70 connected in series with its leads 72 and 74. The switch 70 forms part of a relay whose winding 76 also controls a normally open switch 78 and a normally closed switch 80 to which further reference will be made. The winding 76 is connected across the conductors 50 and 52 through a resistor 82 and actuating means including a normally open switch 84. Connected in parallel with the winding 76 and switch 84, there is a capacitor 86 which will always be connected across the conductors 50 and 52 through the resistor 82. The switch 84 may be closed periodically by the lobe 88 of a cam 90 driven by a timing motor 92 which is energized through leads 94 and 96 connected respectively with the conductors 50 and 52.

When the winding 76 is energized by closure of its switch 84, the energization will be momentary because the value of the resistor 82 has been so selected that insufficient current will flow to produce sustained operation of the relay, the actuation relying upon the charge which has been built up on the capacitor 86.

During the momentary operation of the relay by energization of its winding 76 however, the normally open switch 78 of the test circuit will energize the winding 98 of the test circuit relay from conductor 50, lead 100, lead 102, switch 78, lead 104, normally closed switch 106, and conductor 52. Energization of the winding 98 effects closing operation of its switches 108 and 110, the switch 108 providing holding current for the winding 98 when the winding 76 drops out and its switch 78 opens. The holding contacts or switch 108 will remain effective so long as the switch 106 remains closed. The switch 110 controls the signal producing indicator 112, depicted as an incandescent lamp for purposes of illustration, which will remain energized so long as the winding 98 of its relay remains energized.

The switch 80 in circuit with the winding 46 of the signal responsive device 48 is normally closed but upon energization of its winding 76 is opened to prevent operation of the signal responsive device as result of a testing operation. The switch 80 is so designed that it will open before the switch 70 closes and close after the switch 70 opens. Connected in parallel with the switch 80 and winding 46 of the signal responsive device is a relay winding 114 whose energization opens the contacts of a normally closed switch 106. The winding 114 will be energized only when the switch 44 is closed by energization of its winding 40. Accordingly, if the test signal produced by the lamp 54 is not detected, the winding 40 will not be energized nor will the winding 114, whereupon the indicator 112 will remain effective to indicate faulty operation. If the signal is detected however, the switch 44 will close, energizing the winding 114, opening the switch 106, and deenergizing the winding 98 to open its switches 108 and 110, whereupon there will be no sustained operation of the indicator 112.

The lamps 54 may be energized selectively or jointly. In the case of the housed lamp 54, there is no test of the optical path between the light source and the photosensitive device and accordingly, the accumulation of dust in this area might not be detected. With the external light source 54 however, its light can be reflected from the lower surface of the sheet 26 through the light transmitting plate 30 to the light sensitive device or devices 34 so that the entire system will be tested and faulty operation detected.

A testing operation can be effected at any time that the switch 84 is closed, manually or otherwise. Where the actuation is automatic, the cam 90 can provide as many lobes as may be desired at any intervals preferred. The timing motor 92 for driving the cam can be driven at a desired speed to achieve the frequency of tests preferred.

Whereas only one form of the invention has been illustrated, it will be understood by those skilled in the art that many variations are applicable without departing from the concept. Accordingly, the invention should not be restricted beyond the scope of the appended claims.

I claim:

1. In combination with a pin hole detector having a source of current, a work path, a light source and a shielded photosensitive device disposed on opposite sides of said work path, and an output circuit energized by said photosensitive device and containing a circuit controller, a switch, and a signal responsive device; testing apparatus comprising: an indicator circuit containing a signal producing indicator switch, and a relay therefor responsive to energization of said output circuit of said photosensitive device; a test circuit including a current source, a switch, and a test lamp positioned to direct light upon said photosensitive device; and actuating means interconnected with said source of current and said switches whereby said signal producing indicator will signify the condition of said photosensitive device.

2. The invention as set forth in claim 1 wherein said output circuit switch is normally closed and said actuating means opens said output circuit switch before closing said test circuit switch.

3. The invention as set forth in claim 1 wherein said actuating means operates periodically.

4. The invention as set forth in claim 1 wherein said light source and test lamp are separately excited by similar alternating current frequency sources.

5. The invention as set forth in claim 1 wherein said test lamp is provided with control means for directing a predetermined quantity of light towards said photosensitive device.

6. The invention as set forth in claim 1 wherein the operation of said switches by said actuating means is momentary.

7. The invention as set forth in claim 1 wherein said relay energizes said indicator so long as said photosensitive device fails to respond to light from said test lamp.

8. The invention as set forth in claim 1 wherein said photosensitive device and test lamp are disposed in a common housing.

9. The invention as set forth in claim 1 wherein said indicator switch and said test circuit switch are normally open.

10. The invention as set forth in claim 1 wherein said signal producing indicator is a visual device.

11. The invention as set forth in claim 1 wherein said signal producing indicator is a light source.

12. The invention as set forth in claim 1 wherein energization of said actuating means inactivates said signal responsive device.

References Cited in the file of this patent

UNITED STATES PATENTS

| | | |
|---|---|---|
| 2,456,499 | Fritzinger | Dec. 14, 1948 |
| 2,563,274 | Rendel | Aug. 7, 1951 |